(12) United States Patent
Sears et al.

(10) Patent No.: US 10,656,005 B2
(45) Date of Patent: May 19, 2020

(54) LEVEL SWITCHES

(71) Applicant: Rosemount Measurement Limited, Berkshire (GB)

(72) Inventors: Jeffery Allan Sears, Berkshire (GB); Gregory Michael Leach, Berkshire (GB)

(73) Assignee: ROSEMOUNT MEASUREMENT LIMITED, Berkshire (GB)

(*) Notice: Subject to any disclaimer, the term of this patent is extended or adjusted under 35 U.S.C. 154(b) by 0 days.

(21) Appl. No.: 15/574,571

(22) PCT Filed: May 18, 2016

(86) PCT No.: PCT/GB2016/051430
§ 371 (c)(1),
(2) Date: Nov. 16, 2017

(87) PCT Pub. No.: WO2016/185204
PCT Pub. Date: Nov. 24, 2016

(65) Prior Publication Data
US 2018/0128670 A1 May 10, 2018

(30) Foreign Application Priority Data
May 18, 2015 (GB) .................. 1508478.3

(51) Int. Cl.
G01F 23/296 (2006.01)
G01F 23/00 (2006.01)
(Continued)

(52) U.S. Cl.
CPC ...... *G01F 25/0076* (2013.01); *G01F 23/0007* (2013.01); *G01F 23/0076* (2013.01);
(Continued)

(58) Field of Classification Search
CPC ............. G01F 25/0076; G01F 23/0007; G01F 23/0076; G01F 23/2967; H01H 35/18
(Continued)

(56) References Cited

U.S. PATENT DOCUMENTS 6,712,276 B1 * 3/2004 Abali .................. G01D 9/005
235/380
8,608,026 B1 12/2013 Temko et al.
(Continued)

FOREIGN PATENT DOCUMENTS

AU 2008100552 10/2008
KR 10-2015-0026031 3/2015
(Continued)

OTHER PUBLICATIONS

International Search Report (PCT/ISA/210) and Written Opinion (PCT/ISA/237) from PCT/GB2016/051430, dated Aug. 19, 2016.
(Continued)

*Primary Examiner* — Suman K Nath
(74) *Attorney, Agent, or Firm* — Westman, Champlin & Koehler, P.A.

(57) ABSTRACT

The invention provides a level switch having a near field communications facility which allows at least some functions of the switch to be powered and the communication of data between the switch and a reader. Application and calibration information are examples of data that can be read to and from the switch, both in the factory and in the field.

6 Claims, 1 Drawing Sheet

(51) Int. Cl.
*G01F 25/00* (2006.01)
*H01H 35/18* (2006.01)
*H01H 9/16* (2006.01)

(52) U.S. Cl.
CPC ......... *G01F 23/2967* (2013.01); *H01H 9/168* (2013.01); *H01H 35/18* (2013.01)

(58) Field of Classification Search
USPC .......................................................... 73/658
See application file for complete search history.

(56) References Cited

U.S. PATENT DOCUMENTS

| | | | |
|---|---|---|---|
| 9,496,927 B1* | 11/2016 | Grinberg | H04B 5/0056 |
| 2004/0250623 A1* | 12/2004 | Walker | F16C 19/52 |
| | | | 73/593 |
| 2007/0084283 A1 | 4/2007 | Carlson et al. | |
| 2009/0224930 A1 | 9/2009 | Burza | |
| 2012/0316414 A1* | 12/2012 | Greene | A61B 5/0024 |
| | | | 600/365 |
| 2013/0204202 A1* | 8/2013 | Trombly | A61M 5/172 |
| | | | 604/207 |
| 2014/0373632 A1 | 12/2014 | Ferraro et al. | |
| 2015/0044965 A1* | 2/2015 | Kamon | G06K 7/10297 |
| | | | 455/41.1 |

FOREIGN PATENT DOCUMENTS

| | | |
|---|---|---|
| WO | WO 00/45331 | 8/2000 |
| WO | WO 03/101022 | 12/2003 |
| WO | WO 2004/049237 | 6/2004 |
| WO | WO 2010/128308 | 11/2010 |

OTHER PUBLICATIONS

"Rosemount 2160 Wireless Vibrating Fork Liquid Level Swich", Emerson Process Management, Jan. 2013, 100 pgs.
Search Report from Application No. GB 1508478.3, dated Oct. 28, 2015.

\* cited by examiner

LEVEL SWITCHES

CROSS-REFERENCE TO RELATED APPLICATION

This Application is a Section 371 National Stage Application of International Application No. PCT/ GB2016/ 051430, filed May 18, 2016 and published as WO 2016/ 185204 on Nov. 24, 2016, in English, which claims priority to GB Application No. 1508478.3, filed May 18, 2015, the contents of which are hereby incorporated by reference in their entirety.

FIELD OF THE INVENTION

This invention relates to level switches and in particular, though not necessarily solely, to vibrating fork level switches used to detect moving interface levels in tanks and the like.

BACKGROUND OF THE INVENTION

Existing level switches do not commonly have a communications interface which is accessible after assembly of the switch. This can make it difficult or even impossible to configure, interrogate or test the switch in the field and even in the factory before despatch.

In some examples of level switch a limited degree of configuration is possible using one or more mechanical selectors incorporated in the switch, but these add cost, complication and potential unreliability to the switch, and are often difficult to access without opening the switch enclosure.

It is an object of this invention to provide a level switch that will go at least some way to addressing the aforementioned drawbacks; or which will at least provide a novel and useful choice.

SUMMARY OF THE INVENTION

Accordingly the invention provides a level switch having a sensor and processing circuitry, said switch being characterised in that it incorporates a near field communication facility operable to communicate with a near field communication reader brought within an operating range of said facility, said near field communication facility and said processing circuitry being energisable from said reader.

Preferably said sensor is further energisable from said reader.

Preferably said near field communication facility is configured to exchange data between said reader and said processing circuitry.

Preferably said near field communication facility is configured to communicate calibration data relating to said switch.

Preferably said near field communication facility is configured to communicate diagnostic data from said switch.

Preferably said near field communication facility is configured to allow some control over functionality of said switch.

Preferably said functionality includes self-test functionality and/or licensed functionality.

Preferably said facility and said reader further includes an access control facility configured and operable to limit access there-between.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

The invention will now be described with reference to the accompanying drawings in which.

DETAILED DESCRIPTION OF WORKING EMBODIMENTS

Figure 1:
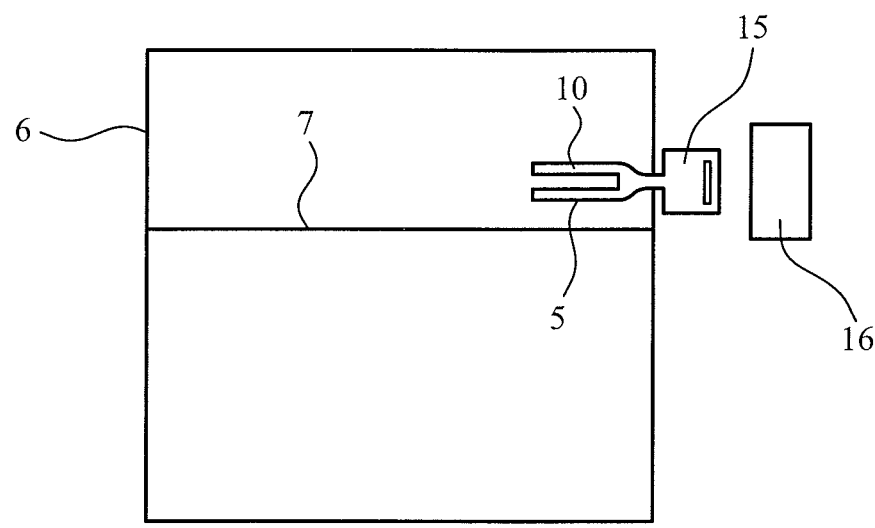
FIG. 1: shows an exaggerated schematic view of a level switch according to the invention installed in a tank.

Referring firstly to FIG. 1 a level switch, in this case a vibrating fork point level switch 5, is mounted in a tank 6 in the conventional manner to monitor changes in medium in the tank, in this case indicated by the position of air/liquid interface 7. As is well known, when the level of interface 7 comes into contact with the switch 5, the frequency of vibration of the switch changes, and this change of frequency is typically used to effect a switching operation.

It must be stressed that FIG. 1 shows the switch 5 mounted in an operating position for the purposes of illustration only. It will evident from the description which follows that significant benefits may arise from this invention well before the switch is put into use.

Figure 2:
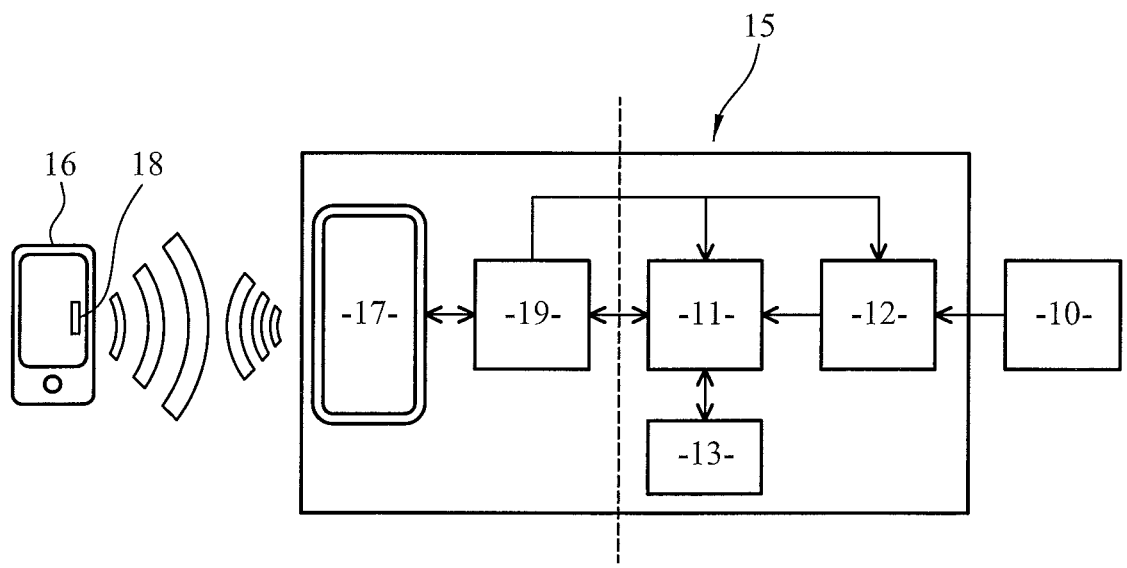
FIG. 2: shows, diagrammatically, the functional elements of a level switch according to the invention.

Turning now to FIG. 2, the switch 5 conventionally includes a sensor 10 which senses a frequency change and communicates this to a processor 11 via a sensor interface 12. The processor 11 determines if the frequency change is of significance and, if so, generates a switching output at 13. The sensor 10 is, in this case, the fork. The remainder of the components 11, 12 and 13 are conveniently mounted within housing 15 from which the fork projects but which, in use, is on the exterior of tank 6.

A characteristic feature of this invention is that the switch 5 is provided with a near field communication (NFC) facility that is indicated generally at 15 in FIG. 2. The NEC facility communicates with reader 16, when the reader is brought within the range of the NFC facility (typically within about 100 mm) allowing commands to be relayed to the switch and data to be transferred between the reader 16 and the switch 5. The communication facility is preferably configured to be passive, that is to say power to operate the facility is induced from the reader. Sufficient power is available to energise the sensor and the processor 11 of a typical level switch (up to 5 mA @ 3.3 volts) but, during operation of the communication facility, the output 13 may be disabled.

In the form shown the facility 15 includes an antenna 17 which communicates with an antenna 18 on the reader, the antennae 17 & 18 preferably acting as an air-cored transformer. Signals and power received by antenna 17 are communicated to an NFC processing chip 19 which, in turn, powers the processor 11 and interface 12; and also communicates data to and from the processor 11. Both the antenna 17 and the chip 19 can be mounted on the switch circuit board along with the operating components 11, 12 & 13 as described above. Typically both power and data can be transmitted through the housing 15, providing the housing is not formed from a conductive metal.

The reader 16 can, for example, be a computer, a dedicated device or a handheld device such as a mobile telephone, many of which are equipped with communications functionality.

The combination of communications facility 15 and reader 16 allows a number of useful data transfers to be effected including some or all of the following:

1. Calibration data may be applied to and read from the switch 5, both in the field and in the factory;
2. Specific product information such as serial numbers, other identity data and approvals information may be read to and from the switch, even in the factory, boxed, and waiting to be despatched;
3. The operating characteristics of the switch can be set for a particular field application and can be altered in the field to fine tune performance having regard to switching point and temperature parameters;
4. A functionality test may be invoked in the field and the results of that test accessed;
5. Data enabling or dis-enabling specific instructions; special and/or additional functionality such as self-testing and enabling functions only available to users having an appropriate license.

The switch may also include an access control facility to prevent unauthorised interference with the switch functionality.

It will be appreciated that, using the present invention, all of the above can be achieved without opening the housing 15, without the need to incorporate any form of mechanical adjustment, and while the switch 5 is unpowered.

The invention claimed is:

1. A vibrating fork level switch operable to vibrate at an operating frequency, the vibrating fork level switch comprising:
   a sensor operable to sense changes in the operating frequency, and
   a processing circuitry,
   wherein the vibrating fork level switch incorporates a near field communication facility operable to communicate with a separate near field communication reader brought within an operating range of the near field communication facility wherein the operating range is about 100 mm;
   the near field communication facility, the processing circuitry, and the sensor being energisable from the separate near field communication reader; and
   the near field communication facility being configured to enable a functionality test of the vibrating fork level switch to be invoked wherein the functionality includes self-test functionality.

2. The vibrating fork level switch as claimed in claim 1 wherein the near field communication facility is configured to exchange data between the separate near field communication reader and the processing circuitry.

3. The vibrating fork level switch as claimed in claim 1 wherein the near field communication facility is configured to communicate calibration data relating to the vibrating fork level switch with the separate near field communication reader.

4. The vibrating fork level switch as claimed in claim 1 wherein the near field communication facility is configured to communicate diagnostic data from the vibrating fork level switch with the separate near field communication reader.

5. The vibrating fork level switch as claimed in claim 1 wherein the functionality includes a licensed functionality.

6. The vibrating fork level switch as claimed in claim 1 wherein the near field communication facility and the separate near field communication reader further includes an access control facility configured and operable to limit access there-between.

* * * * *